(12) United States Patent
Tolciu

(10) Patent No.: US 7,139,220 B2
(45) Date of Patent: Nov. 21, 2006

(54) DYNAMIC FILTER TUNING FOR PULSE-ECHO RANGING SYSTEMS

(75) Inventor: Gabriel Tolciu, Kanata (CA)

(73) Assignee: Siemens Milltronics Process Instruments Inc., Peterborough (CA)

( * ) Notice: Subject to any disclaimer, the term of this patent is extended or adjusted under 35 U.S.C. 154(b) by 282 days.

(21) Appl. No.: 10/825,471

(22) Filed: Apr. 15, 2004

(65) Prior Publication Data

US 2005/0232080 A1   Oct. 20, 2005

(51) Int. Cl.
*G01S 15/00* (2006.01)
(52) U.S. Cl. .................. 367/100; 367/98; 367/99
(58) Field of Classification Search .......... 367/97, 367/98, 99, 100, 908; 73/290 V
See application file for complete search history.

(56) References Cited

U.S. PATENT DOCUMENTS

| 4,197,750 A * | 4/1980 | Hassler ..................... 73/629 |
| 4,204,280 A * | 5/1980 | Slaton ....................... 367/95 |
| 5,511,041 A * | 4/1996 | Michalski ................... 367/99 |
| 6,771,560 B1 * | 8/2004 | Lyon et al. .................. 367/13 |

\* cited by examiner

*Primary Examiner*—Ian J. Lobo
(74) *Attorney, Agent, or Firm*—Fay, Sharpe, Fagan, Minnich & McKee, LLP

(57) ABSTRACT

Dynamic tuning of a tunable filter within the receiver of a pulse-echo ranging system. A filter tuning module compares a transmit signal and a filtered signal to obtain a phase difference indicative of any mis-match between the resonant frequency of the tunable filter and the transmit frequency. The filter tuning module outputs a phase correction signal corresponding to the phase difference and a controller uses the phase correction signal to determine any adjustments necessary to minimize the phase difference. Adjustments to the tunable filter may be made with each 'shot' or transmission.

11 Claims, 4 Drawing Sheets

DYNAMIC FILTER TUNING FOR PULSE-ECHO RANGING SYSTEMS

FIELD OF THE INVENTION

The present invention relates to time-of-flight ranging or pulse-echo ranging systems and, in particular, to a method and apparatus for dynamic filter tuning in pulse-echo ranging systems.

BACKGROUND OF THE INVENTION

Pulse-echo acoustic ranging systems, also known as time-of-flight ranging systems, are commonly used in level measurement applications. Pulse-echo acoustic ranging systems determine the distance to a reflector (i.e. reflective surface) by measuring how long after transmission of a burst of energy pulses the echo or reflected pulses are received. Such systems typically use ultrasonic pulses or pulse radar signals.

Pulse-echo acoustic ranging systems generally include a transducer and a signal processor. The transducer serves the dual role of transmitting and receiving the energy pulses. The signal processor is for detecting and calculating the distance or range of the object based on the transmit times of the transmitted and reflected energy pulses.

Since the transmitted energy pulses are converted into distance measurements, any timing errors arising in the circuitry of the device result in distance measurement errors which degrade the accuracy of the level measurements. In most cases, timing errors are a result of temperature drift and drift over time in the operating characteristics of the electronics in the device circuitry. Accordingly, it is necessary to re-tune time-of-flight ranging systems not only at installation, but on a periodic basis as well in order to ensure accurate level measurements.

While there is a need to periodically tune filters, the time-of-flight ranging systems are not always easily accessible after installation. In addition, there is a cost involved with a technician conducting calibration tests on an ongoing basis.

Accordingly, there remains a need to provide a system and techniques which facilitate dynamic tuning of a filter in pulse-echo or time-of-flight ranging systems while overcoming these and other perceived shortcomings.

SUMMARY OF THE INVENTION

The present invention provides a method and apparatus for performing dynamic filter tuning in a pulse-echo ranging system having a receiver with a tunable filter. With each transmission of a transmit burst, i.e. each 'shot', a filter tuning module compares a transmit signal and a filtered signal to obtain a phase difference indicative of any mismatch between the resonant frequency of the tunable filter and the transmit frequency. Adjustments are made to the tunable filter to minimize the phase difference.

In one aspect, the present invention provides a pulse-echo ranging system that includes a transmitter for generating a transmit signal; a transducer coupled to said transmitter for receiving said transmit signal, emitting energy pulses and detecting reflected energy pulses; a receiver coupled to said transducer, said receiver having an input port for receiving said transmit signal, said receiver including a tunable filter for filtering said input signal and outputting a filtered signal; a tuning module coupled to said receiver and having an input port for receiving said transmit signal and said filtered signal and outputting a phase correction signal corresponding to a phase difference between said transmit signal and said filtered signal; and a controller having an input port for receiving said phase correction signal and a component for tuning said tunable filter based upon said phase correction signal, so as to minimize said phase difference.

In another aspect, the present invention provides a method of tuning a tunable filter in a receiver for a pulse-echo ranging system. The method includes the steps of generating a transmit signal; filtering said transmit signal through the filter to produce a filtered signal; generating a phase correction signal based upon a phase difference between said filtered signal and said transmit signal; and tuning the filter in response to said phase correction signal so as to minimize said phase difference.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which.

Similar reference numerals are used in different figures to denote similar components.

DESCRIPTION OF SPECIFIC EMBODIMENTS

The following description of one or more specific embodiments of the invention does not limit the implementation of the invention to ultrasonic pulse-echo acoustic ranging systems. It will be understood that the present invention may be embodied a variety of ranging systems, including pulsed radar based systems and guided wave radar time domain reflectometry, i.e. TDR based systems. It will also be understood that the present invention is not limited to level measurement applications, but may be employed in a variety of other applications for pulse-echo or time-of-flight ranging systems.

Figure 1:
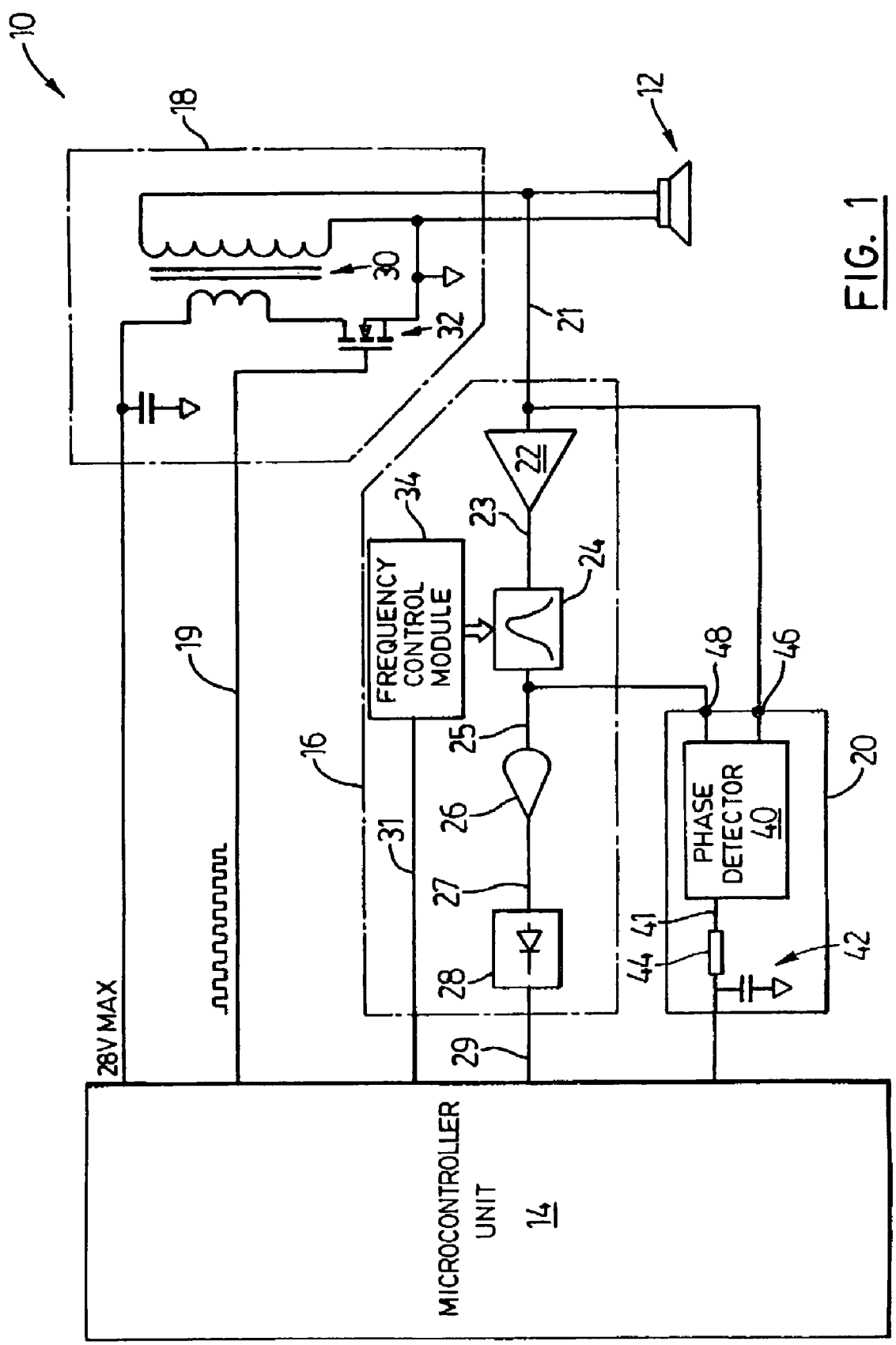
FIG. 1 shows a block diagram of an embodiment of a pulse-echo ranging system in accordance with the present invention.

Reference is first made to FIG. 1, which shows a pulse-echo level measurement system 10. In accordance with one aspect of the present invention, the pulse-echo level measurement system 10 includes a filter tuning module 20. As is described in greater detail below, the filter tuning module 20 provides the capability to tune one or more adjustable components of the pulse-echo level measurement system 10 to compensate for the effects of temperature drift and/or component drift over time.

The pulse-echo level measurement system 10 includes a transducer 12, a microcontroller unit 14, a receiver 16, a transmitter 18, and the filter tuning module 20.

The transducer 12 is coupled to the microcontroller unit 14 through the transmitter 18. The microcontroller unit 14 applies a transmit pulse signal 19 to the transmitter 18, and the transducer 12 emits the transmit pulse signal 19 as ultrasonic pulses. The transmitter 18 comprises a step-up transformer 30 and a FET 32. In one embodiment, the transmit pulse signal 19 is a square wave signal centered on zero volts. At the high voltage side of the transformer 30, the transmit pulse signal 19 may have a peak-to-peak voltage of about 400 Volts.

The ultrasonic pulses emitted by the transducer 12 propagate through the ambient medium, which in some embodiments is air or a vacuum, until they reach an interface, such as the surface of a liquid. At the interface, some portion of the propagated energy is reflected causing reflected or echo pulses to propagate back towards the transducer 12. At the transducer 12, these echo pulses are converted into an electrical signal, which is then input to the receiver 16 as a receiver input signal 21.

As shown in FIG. 1, the receiver 16 is coupled to the transducer 12 in order to receive and process electrical signals, i.e. receiver input signals 21, corresponding to echo pulses received at the transducer 12. The receiver 16 comprises an amplifier 22, a tunable filter 24, a logarithmic amplifier 26, and an envelope detector 28. Receiver input signals 21 are first amplified by the amplifier 22 to produce an amplified signal 23. The amplified signal 23 is filtered through the tunable filter 24 to produce a filtered signal 25. The filtered signal 25 is then further amplified by the logarithmic amplifier 26 to create a logarithmic signal 27, which is then input to the envelope detector 28. The envelope detector 28 outputs an envelope signal 29, which is input to the microcontroller unit 14 where it is sampled and digitized by an analog-to-digital converter. It will be understood that a discrete analog-to-digital converter separate from the microcontroller unit 14 could also be used. The microcontroller unit 14 is suitably programmed to perform the functions described herein, as will be within the understanding of those skilled in the art. In addition to these functions, the. microcontroller unit 14 includes stored program control, i.e. firmware, to execute the functions associated with dynamically tuning the tunable filter 24 as described in more detail below.

The tunable filter 24 is a bandpass filter having an adjustable frequency response. In one embodiment, the bandpass filter is rendered adjustable by providing a plurality of capacitors which may be switched into or out of the circuit in various combinations so as to tune the bandpass filter. Control over the tuning of the tunable filter 24 is exercised by the microcontroller unit 14, which outputs a filter data signal 31 to a frequency control module 34. The frequency control module 34 provides control signals to the tunable filter 24 to tune the bandpass filter. In one embodiment, the frequency control module 34 includes a shift register that provides a set of parallel binary control signals to the tunable filter 24 that determine which capacitors are included in the bandpass filter circuit. The shift register is programmed according to the filter data signal 31, which comprises a serial data signal for setting the bits of the shift register.

It will be understood by those of ordinary skill in the art that a variety of other components, mechanisms and configurations may be used to provide for the receiver 16 having the tunable filter 24.

A problem that may arise in pulse-echo ranging systems that employ a receiver with a tunable bandpass filter is that the tunable bandpass filter may be mis-tuned with regard to the transmit frequency of the pulse-echo ranging system. In other words the resonant frequency of the tunable bandpass filter may differ from the frequency of the transmitted pulse signal. De-tuning of the bandpass filter may occur as a result of inaccurate initial tuning or may occur over time as a result of component drift or temperature changes. When the resonant frequency of the tunable bandpass filter differs from the transmit frequency, the filtered signal that is obtained from the bandpass filter will include unwanted distortions. These distortions may affect the accuracy of measurements and calculations performed by the microcontroller to determine the time-of-flight of pulses and, from that calculation, the distance to an interface. The distortions may also affect the effective range of the pulse-echo ranging system.

The filter tuning module 20 of the present embodiment measures if there is a difference between the resonant frequency of the tunable filter 24 and the frequency of the transmit pulse signal 19, and provides an output to the microcontroller unit 14, which may then make corresponding adjustments to the tunable filter 24. The filter tuning module 20 includes a phase detector 40 coupled to the receiver 16. In particular, the filter tuning module 20 has a first input 46 coupled to the input to the amplifier 22, such that the phase detector 40 receives the receiver input signal 21. A second input 48 of the filter tuning module 20 is coupled to the output of the tunable filter 24, such that the phase detector 40 receives the filtered signal 25.

The phase detector 40 compares the filtered signal 25 with the receiver input signal 21 and determines a phase difference between the two signals. This phase difference is output as a DC phase correction signal 41 and is input to the microcontroller unit 14. In the present embodiment, the microcontroller unit 14 reads the input DC phase correction signal 41 once it has finished its echo collection phase of operation and entered its echo processing phase of operation. Accordingly, the present embodiment includes a memory comprising a memory capacitor 42 and a memory resistor 44. When the phase detector outputs the DC phase correction signal 41 it establishes a charge on the memory capacitor 42 that corresponds to the level of the DC phase correction signal. At the echo processing stage of operation, the microcontroller unit 14 then reads the charge level on the memory capacitor 42 to obtain the phase difference measured by the phase detector 40. Prior to the next transmit burst, the microcontroller unit 14 uses the phase difference information to adjust the tuning of the tunable filter 24, if necessary. Accordingly, the tunable filter 24 may be fine-tuned with each measurement, or "shot", taken by the pulse-echo ranging system 10.

Figure 2:
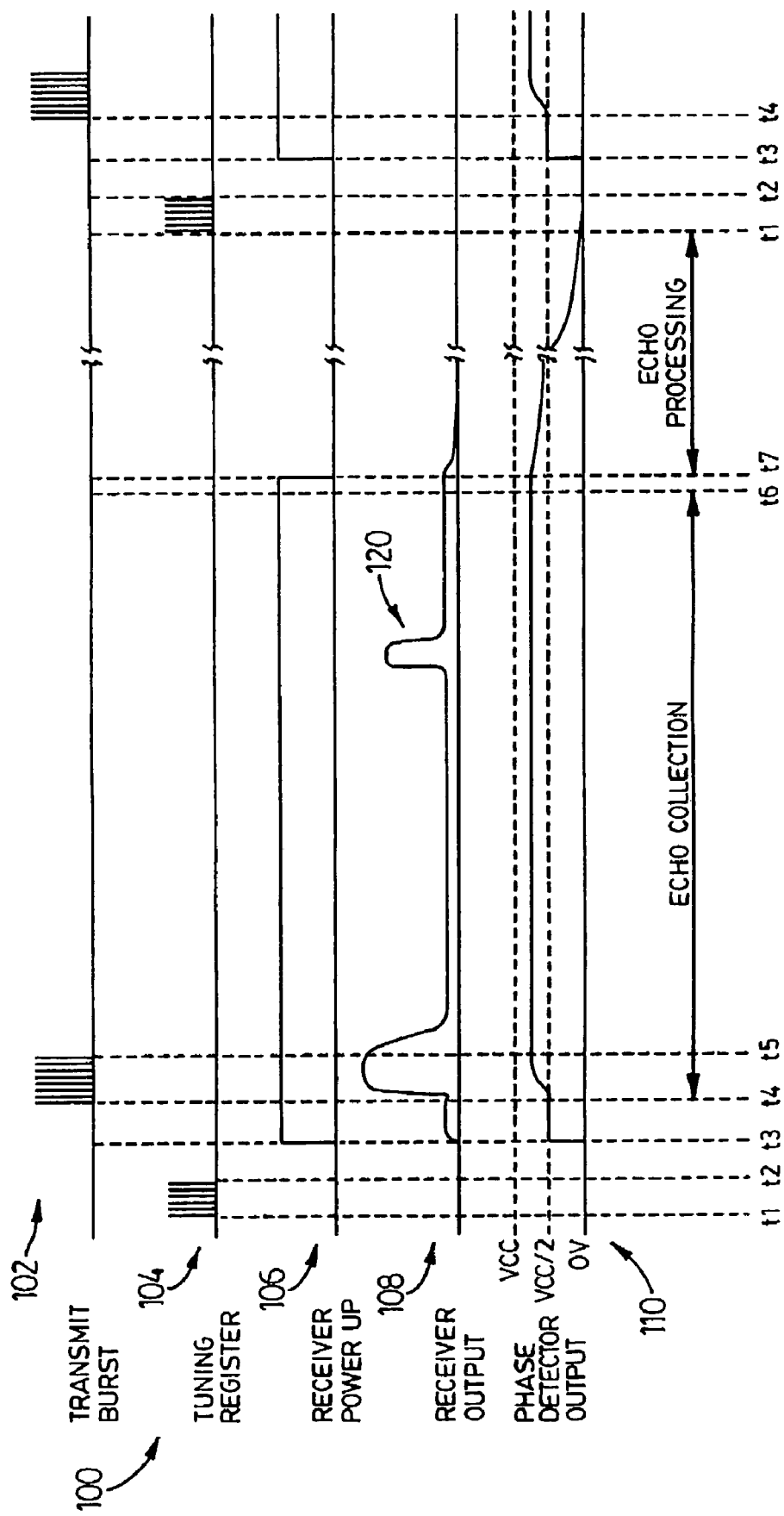
FIG. 2 shows a timing diagram for signals in the pulse-echo ranging system of FIG. 1.

Reference is now made to FIG. 2, which shows a timing diagram 100 for signals in the pulse-echo ranging system 10. The timing diagram 100 includes a transmit burst waveform 102, a tuning register signal waveform 104, a receiver power waveform 106, a receiver output waveform 108, and a phase detector output waveform 110.

As shown by the tuning register signal waveform 104, beginning at a time t1 serial data is loaded into the frequency control module 34 (FIG. 1) via the filter data signal 31 (FIG. 1). By time t2, the serial data has been loaded into the register and the tunable filter 24 (FIG. 1) is tuned accordingly.

At time t3 the receiver 16 (FIG. 1) is powered on, as shown by the receiver power waveform 106. The receiver 16 is de-coupled from the supply voltage during non-operational phases so as to conserve energy.

Time t4 marks the beginning of the echo collection phase of operation. At this time the microcontroller unit 14 (FIG. 1) outputs the transmit pulse signal 19 (FIG. 1), as shown by the transmit burst waveform 102. The transmit pulse signal 19 is simultaneously applied to the transducer 12 (FIG. 1) and the input to the receiver 16. Accordingly, during transmission of the transmit pulse signal 19 the transmit pulse signal 19 is also received as the receiver input signal 21 (FIG. 1) to the receiver 16. The receipt of the transmit pulse signal 19 as the receiver input signal 21 enables the filter tuning module 20 (FIG. 1) to evaluate the tuning of the tunable filter 24 with regard to a known input. The receiver input signal 21 at this stage has constant amplitude and is not dependent upon target characteristics, as would be the case if reflected echo pulses were used by the filter tuning module 20.

In one embodiment, the transmit pulse signal 19 includes at least ten pulses at the transmit frequency. Providing for a minimum number of pulses avoids incorporating the transient effects found at the beginning of the phase detection process into the final phase difference determination.

It will be noted from the phase detector output waveform 110 that the DC phase correction signal 41 (FIG. 1) is initially, at time t3, set to Vcc/2 to indicate zero degrees phase shift. Once the transmit burst is initiated at time t4, the phase detector 40 (FIG. 1) begins to adjust the DC phase correction signal 41 in response to the measured phase difference between the receiver input signal 21 and the filtered signal 25 (FIG. 1). As shown by the phase detector output waveform 110, at the end of the transmit burst, time t5, the DC phase correction signal 41 is sampled and held for the remainder of the echo collection phase.

The receiver output waveform 106 shows an echo pulse 120 indicative of a reflected echo having been received by the transducer 12. At time t6, the echo collection phase ends. The microcontroller unit 14 then reads the value of the DC phase correction signal 41. Shortly thereafter, at time t7, the receiver 16 is powered down and the echo processing phase begins.

During the echo processing phase, the microcontroller unit 14 determines the actual resonant frequency of the tunable filter 24. It may then compare this calculated resonant frequency with the transmit frequency. From the comparison, the microcontroller unit 14 may determine an appropriate adjustment to be made to the tunable filter 24. In one embodiment, the tunable filter 24 includes an LC resonant circuit having a plurality of capacitors that may be switching into or out of the LC resonant circuit to change its resonant frequency. Accordingly, the microcontroller unit 14 may determine an appropriate adjustment to the capacitance to compensate for the measured difference between transmit frequency and the measured resonant frequency. For example, the microcontroller unit 14 may determine an appropriate tuning capacitance value from the following relationship:

$$C_{new} = C_{old}\left(\frac{f_{res}}{f_{transmit}}\right)^2 \qquad (1)$$

where $f_{transmit}$ is the transmit frequency, $f_{res}$ is the measured resonant frequency, $C_{old}$ is the old capacitance value, and $C_{new}$ is the new capacitance value. Based upon the calculated value of $C_{new}$ the microcontroller unit 14 determines the appropriate bit pattern, e.g. byte, to be loaded into the shift register, i.e. the frequency controller 34, to provide the closest capacitance value to $C_{new}$. Just before the next "shot" the new bit pattern is loaded into the shift register, as shown in the tuning register waveform 104.

It will be appreciated that the microcontroller unit 14 may be suitably programmed by one of ordinary skill in the art to implement the above operations and functions. It will also be appreciated that the microcontroller unit 14 may perform such operations or functions under stored program control, which may be implemented using firmware or other memory elements.

Figure 3:
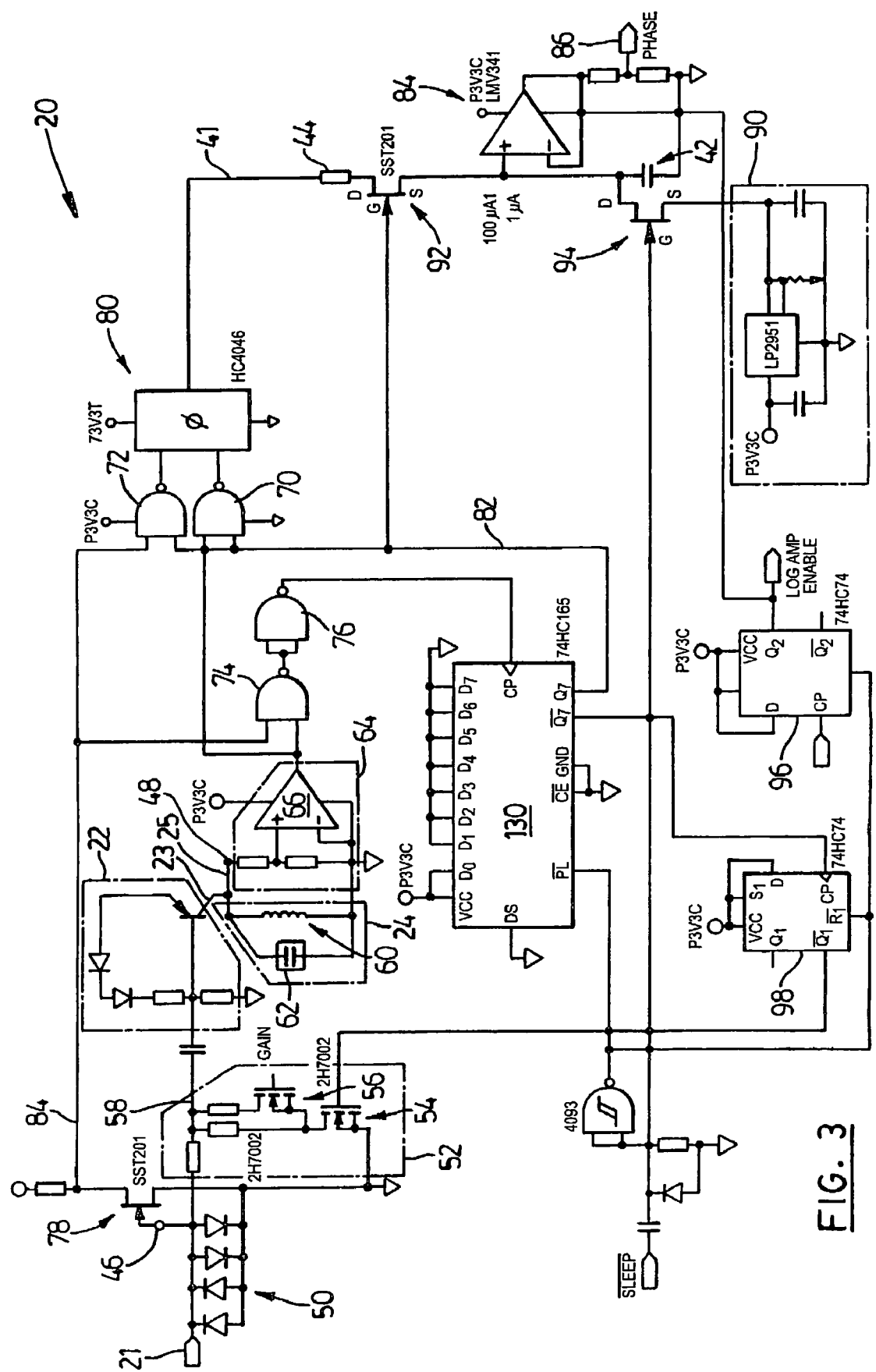
FIG. 3 shows a circuit diagram of an embodiment of a dynamic filter tuning module in accordance with the present invention.

Reference is now made to FIG. 3, which shows a circuit implementation according to an embodiment of the filter tuning module 20. The circuit shown in FIG. 3 also shows portions of the receiver 16 (FIG. 1) including the amplifier 22 and the tunable filter 24.

The first input 46 of the filter tuning module 20 is coupled to the transducer 12 (FIG. 1) and receives the receiver input signal 21. A voltage limiter 50 is coupled between the transducer 12 and the receiver 16 so that the receiver input signal 21 does not exceed a predetermined amplitude. The voltage limiter 50 includes a number of diodes connected in parallel in either direction between the first input 46 and ground. The voltage limiter 50 limits the receiver input signal 21 to about ±0.7 to 0.8 Volts. On the high-side of the transformer 30 (FIG. 1) coupled to the transducer 12, the transmit pulse signal 19 may have an amplitude of about 400 Volts peak-to-peak, in which case the voltage limiter 50 protects the components of the receiver 16 and the filter tuning module 20. The voltage limiter 50 also provides an intrinsically safe barrier.

As shown in FIG. 3, in this embodiment the receiver input signal 21 is input to a gain adjustment stage 52 prior to the amplifier 22. The gain adjustment stage 52 is provided to attenuate the receiver input signal 21 during the transmit burst. During transmission, the receiver input signal 21 will have significant amplitude, limited by the voltage limiter 50, but excessively high in view of the subsequent amplifier 22 stage. If the voltage-limited receiver input signal 21 were applied directly to the amplifier 22, it may saturate the amplifier 22, causing distortions in the amplified signal 23 that may affect the phase measurements. Therefore, the gain adjustment stage 52 is employed to attenuate the receiver input signal 21 in anticipation of its amplification by the amplifier stage 22.

The gain adjustment stage 52 includes a first field effect transistor (FET) 54 and a second FET 56 to act as switches for providing selectable voltage division. The two FETs 54 and 56 provide the gain adjustment stage 52 with a high and a low adjustment setting. If the first FET 54 is on, then the voltage division is established by the relative values of a base resistor and a divider resistor coupled to the drain of the first FET 54. If the second FET 56 is also on, then it couples another divider resistor in parallel with the first divider resistor, thereby lowering the overall divider resistance and providing a larger voltage divider ratio between the base resistor and the two parallel divider resistors. A midpoint node 58 between the base resistor and the two parallel divider resistors comprises the output of the gain adjustment stage 52. The midpoint node 58 is coupled to the amplifier 22 through a coupling capacitor. The gate of the second FET 56 receives an internal logic signal GAIN for gain control. The logic signal GAIN is used primarily to switch the gain of the receiver to allow a larger input dynamic range. When the logic signal GAIN is HIGH, the gain is high (e.g. 32 dB); when the logic signal GAIN is LOW, the gain is low (e.g. 17 dB). To compensate for the extra gain which would saturate the amplifier during a transmit burst, the logic signal GAIN is also used to increase the divider ratio of the gain adjustment stage 52 by coupling another divider resistor in parallel with the first divider resistor in a manner as described above. The switching of the logic signal GAIN for changing the gain of the receiver is implemented as a circuit (not shown) which switches in/out a resistor coupled to the emitter of a PNP BJT (not shown).

The amplifier 22 outputs the amplified signal 23, which is then input to the tunable filter 24. The tunable filter 24 includes an inductor 60 and a variable capacitance 62. The variable capacitance 62 may include one or more capacitors and switches for selectively coupling the capacitors to the inductor 60. The variable capacitance 62 is controlled by the frequency controller 34 (FIG. 1) based upon the filter data signal 31 (FIG. 1) received from the microcontroller unit 14 (FIG. 1). The output of the tunable filter 24 provides the filtered signal 25. The filtered signal 25 is then input to the logarithmic amplifier 26 (FIG. 1) and the envelope detector 28 (FIG. 1).

The output of the tunable filter 24 is also coupled to the second input 48 of the filter tuning module 20. In particular, the output of the tunable filter 24 is coupled to a zero-crossing detector 64. The zero-crossing detector 64 comprises an operational amplifier 66 configured to receive the filtered signal 25 as an input through a voltage divider and to output a logic level signal corresponding to the polarity of the filtered signal 25. Accordingly, the output of the operational amplifier 66 indicates a rising zero-crossing by a transition from logic zero to logic one and a falling zero-crossing by a transition from logic one to logic zero.

The output of the zero-crossing detector 64 is input to a set of NAND gates. In particular, it is input to NAND gate 70, which receives as its other input an enable signal 82 from a shift register 130, which is described in greater detail below. The output of the NAND gate 70 is input to a phase comparator 80. The other input to the phase comparator 80 is the output from NAND gate 72. The inputs to NAND gate 72 include the enable signal 82 and a transmit signal 84. The transmit signal 84 is obtained from the drain of a junction-FET (JFET) 78 that has its source coupled to ground and its gate coupled to the first input 46. Accordingly, it receives the receiver input signal 21 as an input at its gate. The JFET 78 converts the receiver input signal 21, which is a square wave of amplitude ±0.7 to 0.8 Volts into a positive waveform. In otherwords, the transmit signal 84 at the drain of the JFET 78 comprises a logic-level signal that maintains the phase characteristics of the transmit pulse signal 19 (although it may be shifted by 180 degrees).

Therefore, the phase comparator 80 compares the output of the zero-crossing detector 64 with the transmit signal 84 from the JFET 78. The phase comparator 80 may be a commercially available integrated circuit device. It outputs the DC phase correction signal 41. The DC phase correction signal 41 may be positive or negative so as to indicate a leading or lagging phase difference, and its amplitude is proportional to the phase difference.

As described in connection with FIG. 1, the DC phase correction signal 41 adjusts the charge on the memory capacitor 42, which is coupled to a buffered output stage 84 having an output port 86 coupled to an input of the microcontroller unit 14 (not shown). The microcontroller unit 14 reads the voltage level at the output port 86 and uses the information to determine whether, and to what extent, to re-tune the tunable filter 24.

The filter tuning module 20 also includes a voltage reference pre-charger 90 that is coupled to the memory capacitor 42. The voltage reference pre-charger 90 pre-charges the memory capacitor 42 to a pre-determined level, such as Vcc/2. The memory capacitor 42 should have an accurate pre-charge applied so that the effect of the DC phase correction signal 41, whether positive or negative, is accurately captured.

Switches 92 and 94 are provided to reduce leakage current when the filter tuning module 20 is in an off-mode. The reduction of power consumption during off-mode is also the function of a first flip-flop 96. A second flip-flop 98 is configured to control the gain adjustment stage 52.

The shift register 130 that outputs the enable signal 82 is provided so that the phase comparison performed by the phase comparator 80 takes place after a predetermined number of transmit pulses have passed. Because transient effects may be present in the initial pulses, the filter tuning module 20 waits until a predetermined number of pulses have passed before performing the phase comparison. The shift register 130 counts the number of pulses and triggers the enable signal 82 once the predetermined number of pulses have passed.

The shift register 130 includes a clock input 132 coupled to a pair of NAND gates 74, 76. The NAND gate 74 receives as inputs the transmit signal 84 and the output of the zero-crossing detector 64. When both of these inputs go high, thereby indicating a pulse, the output of NAND gate 74 goes low. The output of NAND gate 74 is inverted by NAND gate 76. Accordingly, when a pulse is detected, the shift register 130 is clocked.

In one embodiment, the filter tuning module 20 counts seven pulses before triggering phase comparison. The shift register 130 is preloaded with a one in the least significant bit position and zeros in the other bit positions. With each pulse detected, the shift register 130 is clocked, moving the preloaded bit one bit position. On detection of the seventh pulse, the preloaded bit is advanced to the most significant bit position and is output at output port $Q_7$ as the enable signal 82.

Figure 4:
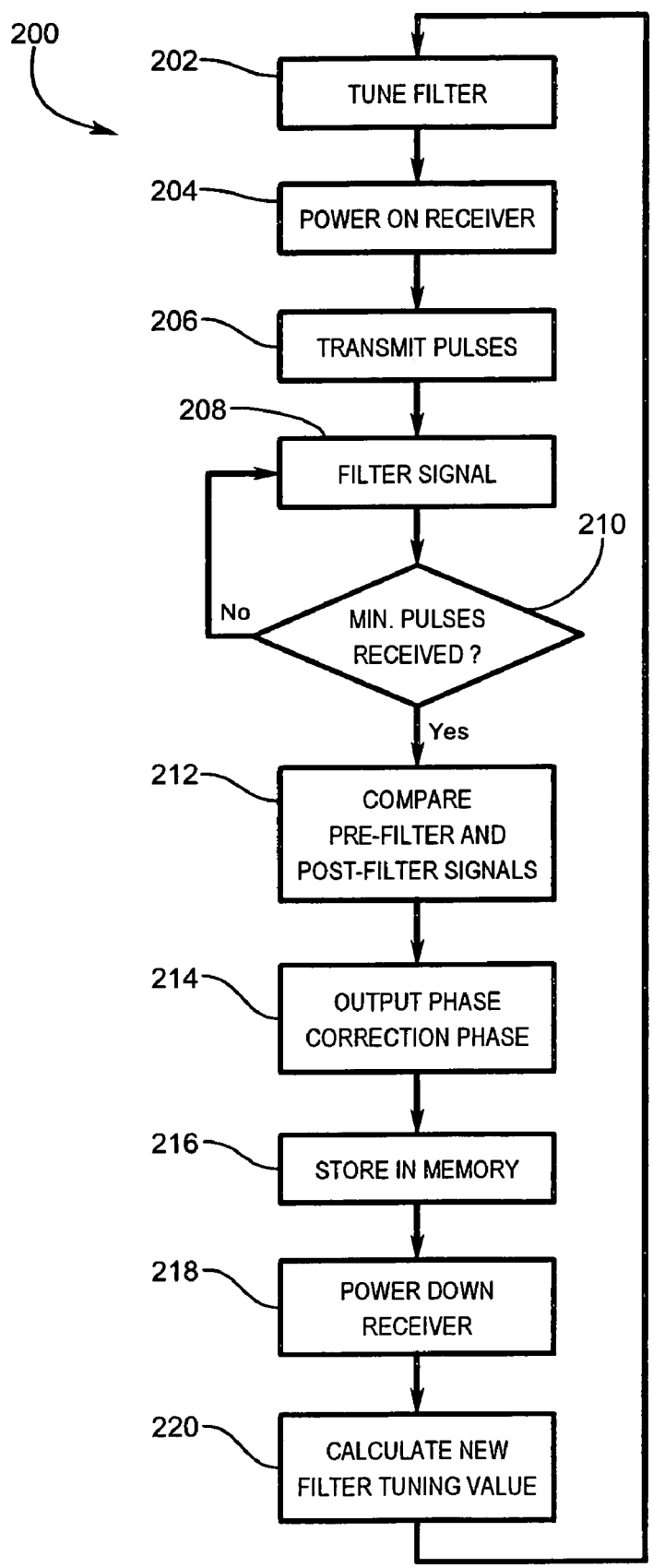
FIG. 4 shows, in flowchart form, a method for dynamically tuning a filter in a pulse-echo ranging system.

Reference is now made to FIG. 4, which shows, in flowchart form, a method 200 of dynamic filter tuning in a pulse-echo ranging system. The method 200 begins in step 202, wherein the tunable filter 24 (FIG. 1) is tuned to a particular frequency. As described above, this may be accomplished by switching capacitors or other reactive elements into or out of the filter circuit. Any other mechanism for tuning a filter may also be employed.

In step 204, the receiver 16 (FIG. 1) is energized with power, for example, where it was previously placed in a 'sleep' or 'low-power' mode. Then in step 206 the pulse-echo ranging system 10 (FIG. 1) sends the transmit pulses. These pulses are received by the receiver 16 and are filtered by the tunable filter 24 in step 208.

In step 210, the filter tuning module 20 assesses whether the minimum number of transmit pulses have been received by the receiver 16. If not, then the method 200 returns to step 208 to continue filtering the received pulses. If the minimum number of pulses have been received, then the method 200 proceeds to step 212 where the pre-filter signal and the post-filter signal are compared. In one embodiment, this comparison is performed by the phase comparator 80 (FIG. 3).

The comparison results in the output of a phase correction signal 41 (FIG. 1) in step 214. This phase correction signal 41 is stored in memory in step 216. It will be understood that the steps of filtering 208, comparing 212, outputting 214 and storing 216 are not necessarily temporally distinct and may be performed concurrently. For example, although comparison of the signals begins in step 212, the receiver 16 continues to filter the received pulses, as in step 208.

After the echo collection phase of operation, in step 218 the receiver 16 may be powered-down to conserve energy. The microcontroller unit 14 (FIG. 1) reads the stored output phase correction signal 41 from memory and determines a new filter tuning. This may include determining the measured resonant frequency of the tunable filter 24, comparing it to the transmit frequency and determining an appropriate adjustment to the reactance in the filter circuit to minimize the difference between the transmit frequency and the resonant frequency.

The method 200 then returns to step 202 where the newly calculated adjustments are used to re-tune the tunable filter 24 and the process repeats with the next shot.

The operations and processing steps described above are readily implemented in firmware or software, as functions or code components, by one of ordinary skill in the art for execution by the microcontroller or other stored program control device.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A pulse-echo ranging system, comprising:
   a transmitter for generating a transmit signal;
   a transducer coupled to said transmitter for receiving said transmit signal, emitting said transmit signal as energy pulses, detecting reflected energy pulses and converting said reflected energy pulses to a transmit electrical signal;
   a receiver coupled to said transducer, said receiver having an input port for receiving said transmit electrical signal, said receiver including a tunable filter for filtering said transmit electrical signal and outputting a filtered signal;
   a tuning module coupled to said receiver and having an input port for receiving said transmit electrical signal and said filtered signal and outputting a phase correction signal corresponding to a phase difference between said transmit electrical signal and said filtered signal; and
   a controller having an input port for receiving said phase correction signal and a component for tuning said tunable filter based upon said phase correction signal, so as to minimize said phase difference.

2. The pulse-echo ranging system claimed in claim 1, wherein said tuning module includes a phase comparator, said phase comparator generating said phase correction signal based upon said phase difference.

3. The pulse-echo ranging system claimed in claim 2, wherein said phase correction signal is preset to a predetermined DC level and wherein said phase comparator adjusts said phase correction signal up or down based upon said phase difference.

4. The pulse-echo ranging system claimed in claim 2, wherein said tuning module includes a memory coupled to said phase comparator, said memory storing a value of said phase correction signal, and wherein said memory is operatively coupled to said controller for reading said memory.

5. The pulse-echo ranging system claimed in claim 4, wherein said memory includes a capacitor for storing a DC voltage level of said phase correction signal.

6. The pulse-echo ranging system claimed in claim 1, wherein said tunable filter includes a LC bandpass filter circuit and said LC bandpass filter circuit includes a variable reactor.

7. The pulse-echo ranging system claimed in claim 6, wherein said variable reactor includes a plurality of capacitors selectively coupled to said LC bandpass filter circuit, wherein said plurality of capacitors are responsive to control signals from said controller for selectively switching into said LC bandpass filter circuit.

8. The pulse-echo ranging system claimed in claim 7, wherein said controller includes a component for generating said control signals, and said control signals couple selected ones of said plurality of capacitors to said LC bandpass filter circuit.

9. The pulse-echo ranging system claimed in claim 6, wherein said controller includes a filter adjustment module, said filter adjustment module for calculating a resonant frequency of said tunable filter based upon said phase correction signal and further for calculating a desired reactance value so as to minimize said phase difference, wherein said controller is operable to generate a filter control signal to set said variable reactor at a reactance value that is based upon said desired reactance value.

10. The pulse-echo ranging system claimed in claim 1, wherein said transmit electrical signal includes a plurality of electrical pulses and said tuning module includes a pulse counter for counting a number of electrical pulses received by said tuning module based upon said transmit electrical signal, and wherein said tuning module determines said phase difference after the number of electrical pulses reaches a predetermined minimum.

11. The pulse-echo ranging system claimed in claim 10, wherein said pulse counter outputs an enable signal when said number of electrical pulses reaches said predetermined minimum, and wherein said tuning module includes a phase comparator, said phase comparator receiving said transmit electrical signal, said filtered signal and said enable signal, and said phase comparator performing phase comparison between said transmit electrical signal and filtered signal in response to said enable signal.

* * * * *